F. J. FRIES & G. BIRK.
DEVICE FOR CONVERTING AUTOMOBILES INTO PRIME MOVERS.
APPLICATION FILED MAR. 29, 1917.
1,253,953.
Patented Jan. 15, 1918.
2 SHEETS—SHEET 1.
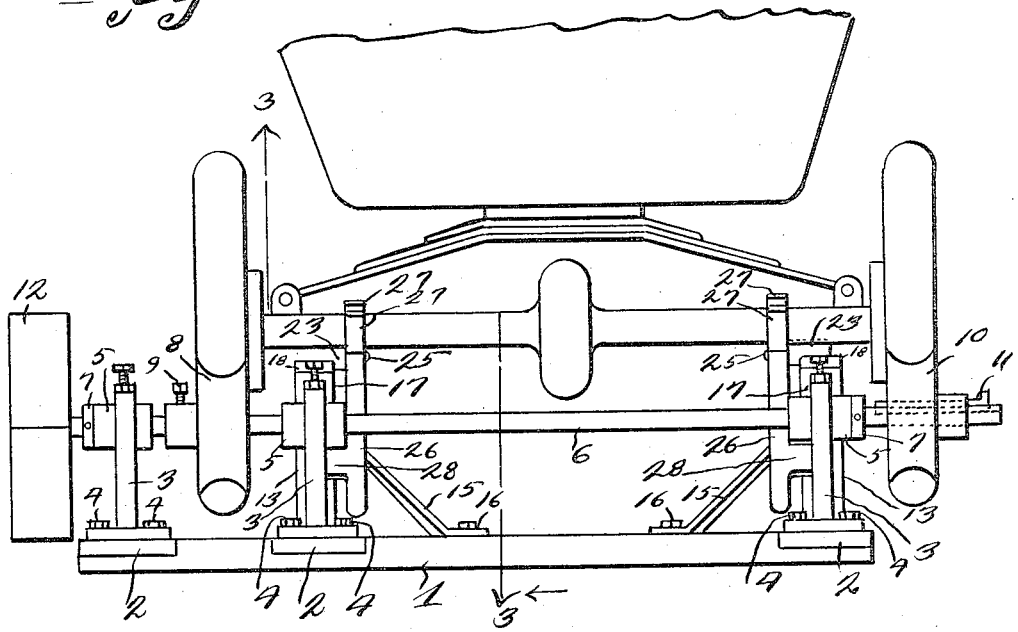
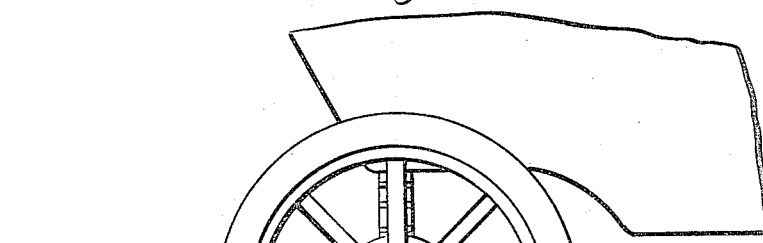
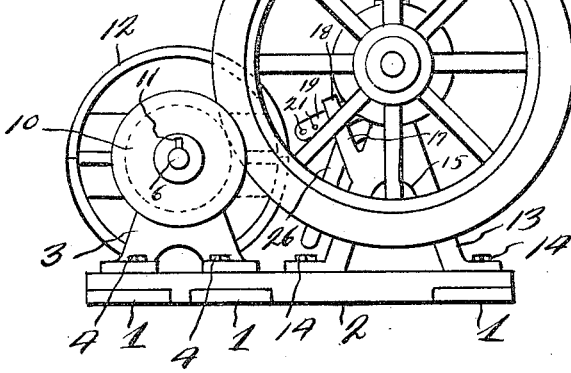

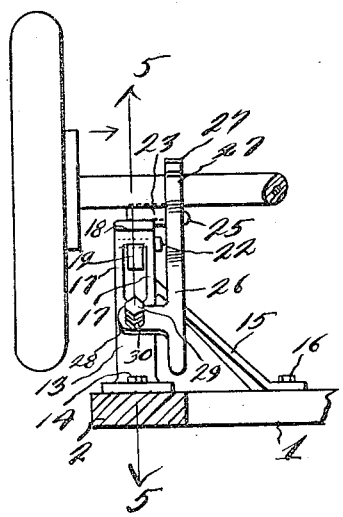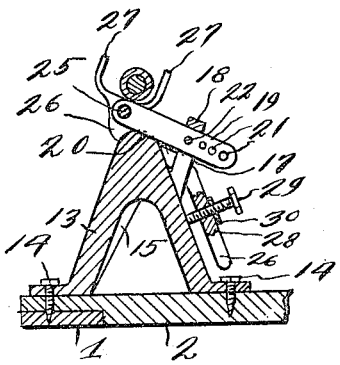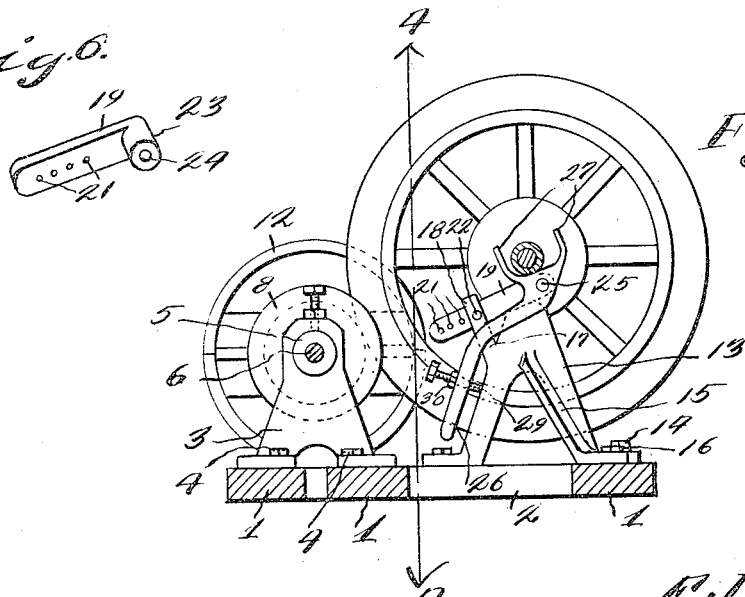

UNITED STATES PATENT OFFICE.

FRANK J. FRIES AND GEORGE BIRK, OF PACIFIC, MISSOURI.

DEVICE FOR CONVERTING AUTOMOBILES INTO PRIME MOVERS.

1,253,953.     Specification of Letters Patent.     Patented Jan. 15, 1918.

Application filed March 29, 1917. Serial No. 158,463.

*To all whom it may concern:*

Be it known that we, FRANK J. FRIES and GEORGE BIRK, citizens of the United States, residing at Pacific, in the county of Franklin, State of Missouri, have invented a new and useful Device for Converting Automobiles into Prime Movers; and we do hereby declare the following to be a full, clear, and exact description of the invention, such as will enable others skilled in the art to which it appertains to make and use the same.

The invention is a device for converting automobiles into prime-movers and aims to provide, as one of its objects, a means, whereby an automobile may be utilized to drive various kinds of stationary machinery.

A further object is to provide, in such a device, means for quickly and effectively attaching the automobile, so that the prime-mover object may be attained.

A still further object is to make the device adjustable, so that it may be used with automobiles of various widths of wheel base and various diameters of wheels.

A still further object is to provide a device to receive power from an automobile by frictional contact with its driving wheel and to make this frictional contact variable as regards the pressure between the automobile wheels and the driven means of the device.

A further object is to provide, in such a device, a driven means capable of a maximum area of contact with the automobile wheels.

To attain the several objects, a base is provided on which a counter-shaft is mounted, the counter-shaft being held in suitable bearing. Pulleys are secured to the counter-shaft and have grooved faces for frictional contact with the driving wheels of an automobile. Both pulleys are stationary with regard to the rotary movement of the counter-shaft but one is movable longitudinally on the shaft. In conjunction with the counter-shaft means is provided and attached to the base to raise the driving axle of an automobile and bring its wheels into engagement with the aforementioned pulley.

Other objects of the invention will appear in the detailed description which follows.

In setting forth this invention a particular structure has been adhered to, but the right is claimed to vary the details of this structure to suit the demand of practice, provided such variations are comprehended in spirit by the appended claim.

A uniform system for designating the various parts of the invention obtains in all the figures of the drawings, wherein:

Figure 1, is a side elevation of the device, the driving axle and wheels of an automobile being shown connected thereto.

Fig. 2 is an end elevation.

Fig. 3 is a section on the line 3—3 of Fig. 1.

Fig. 4 is a section on the line 4—4 of Fig. 3.

Fig. 5 is a section on the line 5—5 of Fig. 4.

Fig. 6 is a detailed perspective view of the arm to which one of the raising levers is pivoted.

The base comprises the longitudinal members 1 and the transverse member 2, these members being suitably connected together to bring their several surfaces flush with each other. As illustrated, the base is supposed to be made of wood but it may be of any acceptable material. Bearing supports 3 are attached to the base on the transverse members 2, suitable lag-screws 4 effecting the attachment. Each support 3 is provided with a bearing 5 in which a shaft 6 is journaled. The collars 7 are secured to the shaft 6, abutting the outer ends of the outermost bearings 5 to prevent longitudinal movement of the shaft therein. A pulley 8 is affixed to the shaft 6 by means of a set screw 9 which is threaded through its hub. At the opposite end of the shaft 6 a pulley 10 is mounted, being secured against rotary movement on the shaft by the spline 11 which, however, permits the pulley 10 to be moved longitudinally on the shaft. Both the pulleys 8 and 10 have their faces grooved to conform to the cross-sectional contour of automobile tires, so that the latter may obtain the greatest area of contact therewith.

The conventional split pulley 12 is secured to the shaft 6 at the end remote from the spline 11 and serves to transmit, to the machines to be run by the automobile, the power received by the shaft 6 from the automobile driving wheels.

Directly back of two of the supports 3 and attached to the base are standards 13. These standards have the shape of inverted V's, through the feet of which suitable lag-screws 14 pass to attach the standards to the base. A brace 15 emanates from the side of each standard and is integral therewith, this brace being at an angle both horizontally and vertically with respect to the standard, so that it may be secured to the rear longitudinal piece 1 of the base by the lag-screw 16. Each standard 13 has two integral arms 17 extending angularly from one of its legs. These arms are united at their top by an integral cross-piece 18, beneath which and between the arms one end of the movable arm 19 is held, the other end of said movable arm resting on the bottom of a shallow slot 20 formed in the upper end of the stand. The arm 19 has a series of holes 21 adapted to be brought into registration with holes in the arms 17, through which holes and through holes 21 the pin 22 is adapted to be inserted to hold the arm 19 in any one of several positions.

Each arm 19 has a boss 23 at one end thereof, the boss having a central hole 24 in which a pin 25 is inserted. The pin 25 acts as a pivotal mounting for the lever 26 which lever has a U-shaped end whose legs 27 are deeply spaced from the pivot 25 on either side thereof. The lever 26 has an ear 28 which projects in front of the standard 13, this ear being tapped to receive the screw 29 whose lock nut 30 secures it firmly to the ear after having been once properly adjusted.

The device is utilized to convert an automobile into a prime-mover by moving the automobile close enough to the device to permit the U-shaped ends of the levers 26 to engage the driving axle when these U-shaped ends are lowered by raising the handle-ends of the lever. After having been made to engage the axle of the automobile, the U-shaped ends of the levers will operate (when the handle-ends are depressed) to raise the axle and bring its wheels into frictional engagement with the groove pulleys 8 and 10 of the counter-shaft. The outer legs 27 first engage the axle in the raising operation of the lever, but when the levers 26 are depressed to the point where the screws 29 bear upon the standards 13, the U-shaped ends of the levers 26 are inclined toward the counter-shaft, the automobile axle sliding down the inclines thus formed until the wheels are brought in contact with the pulleys 8 and 10.

It will be seen that, when the automobile wheels and pulleys 8 and 10 are in contact, the axle will rest on that side of the pivots tending to keep the levers 26 depressed.

When the wheel bases of automobiles vary (as is the case of the different makes of machine) the positions of the pivots 25 can be changed to suit the new conditions by withdrawing the pins 22 and moving the arms 19, so that new holes, 21 may be engaged by the pins 22 when they are replaced. It is obvious that the adjustment of the positions of the arms 19 raises the pivots 25 farther from the base as well as farther from the counter-shaft. It is also obvious that the adjustment of the screws 29 will affect the angle of inclination of the U-shaped ends when they are raised and thereby effect the frictional contact between the automobile wheels and the pulleys 8 and 10, the greater the angle of inclination of the U-shaped ends the greater the frictional contact between the pulleys and automobile wheels.

The arms 19 are designed to be so positioned that when the U-shaped ends of the levers 16 are raised the automobile wheels will be brought into contact with the pulleys 8 and 10 without the axle being brought into contact with the inner legs 27 of the U-shaped ends.

The pulley 10 is movable longitudinally on the shaft 6, so that its distance from pulley 8 may be varied to make the device serviceable with automobiles of different widths of wheel base, the pulley 10 being prevented from sliding off the shaft by means of the upright projection on the spline 11.

The invention having been described, what is claimed as new and useful is:

In a device for converting automobiles into prime-movers, the combination of a counter-shaft and pulleys having grooved faces carried thereby, of supports for the counter-shaft, a base to which the supports are secured, stands secured to the platform, arms supported at the top of the stands, and levers pivoted to the arms, said arms being adjustable to change the pivotal positions of the levers with respect to the stands, said levers having U-shaped ends to engage the driving axle of an automobile and raise its wheels from the ground to bring them into engagement with the aforesaid pulleys, said levers further having an adjustable limiting stop to vary the angle of inclination of the U-shaped end when raised so that the frictional contact between the pulleys and the automobile wheels may be increased or decreased.

In testimony whereof we have signed our names to this specification in the presence of one subscribing witness.

FRANK J. FRIES.
GEORGE BIRK.

Witness:
E. A. ROEMER.

Copies of this patent may be obtained for five cents each, by addressing the "Commissioner of Patents, Washington, D. C."